United States Patent [19]

Houwer

[11] Patent Number: 4,632,020

[45] Date of Patent: Dec. 30, 1986

[54] AIR CONDITIONING SYSTEMS FOR A ROOM

[75] Inventor: Gerke Houwer, Alphen a/d Rijn, Netherlands

[73] Assignee: Ingenieursbureau Macoma B.V., Middleburg, Netherlands

[21] Appl. No.: 622,448

[22] Filed: Jun. 20, 1984

[30] Foreign Application Priority Data

Jun. 21, 1983 [NL] Netherlands ............... 8302202

[51] Int. Cl.[4] .............................................. F24F 5/00
[52] U.S. Cl. ........................................ 98/31.6; 98/36; 165/54
[58] Field of Search ............... 47/17; 98/6, 31, 31.6, 98/34.6, 36; 165/53, 54; 119/15, 160

[56] References Cited

U.S. PATENT DOCUMENTS

| | | | |
|---|---|---|---|
| 3,048,094 | 8/1962 | Bailey | 98/31 X |
| 3,143,952 | 8/1964 | Simons | 98/6 X |
| 3,436,930 | 4/1969 | Smith | 62/419 X |
| 3,487,766 | 1/1970 | Wood | 98/31 |
| 3,804,156 | 4/1974 | McDonough | 165/27 |
| 3,956,852 | 5/1976 | Ceausescu et al. | 47/17 |

FOREIGN PATENT DOCUMENTS 830084  7/1938  France .......................... 98/6

Primary Examiner—Harold Joyce
Attorney, Agent, or Firm—Watson, Cole, Grindle & Watson

[57] ABSTRACT

An air conditioning system for a room, in particular in buildings for cultivating plants or housing animals, provided with one or more heating/cooling elements of an open structure and one or more fans for circulating air along the heating/cooling elements. In the room vertical separation elements are realized, being not or hardly air permeable, such that the room is not divided in separate confined partial rooms and that in each case air can be displaced by one or more of the number of fans along one of the number of horizontal air circulation paths, determined by the positioning of the separating elements and the fans, in which air circulation paths in each case at least one heating/cooling element is provided.

24 Claims, 4 Drawing Figures

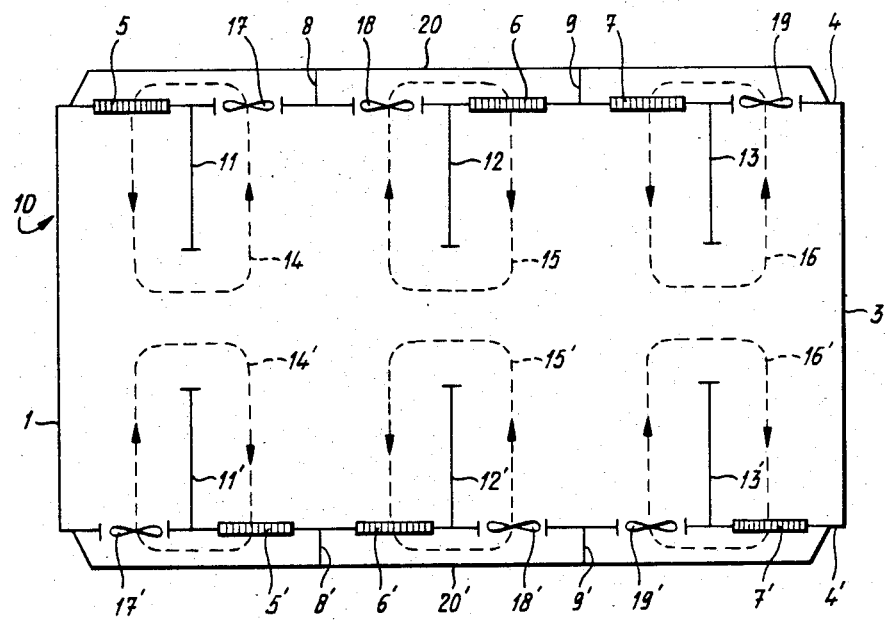

AIR CONDITIONING SYSTEMS FOR A ROOM

BACKGROUND OF THE INVENTION

The invention relates to an air conditioning system for a room, more particularly in buildings for cultivating plants or housing animals, provided with one or more heating/cooling elements of an open structure and one or more fans for circulating air along the heating-/cooling elements.

In green houses for cultivating plants and buildings for housing animals, such as for instance in chicken runs or green houses for vegetables, the problem arises that in relative colder areas on earth the building or the green house has to be heated at least during a part of the year, and in relatively warmer areas on earth the problem arises that the building has to be cooled during at least a part of the year.

In green houses for cultivating vegetables or in buildings for housing animals, for instance in colder areas such as The Netherlands, England, Germany and other countries on similar latitude, the green house or the building has to be heated during at least a part of the year and for this purpose one uses for instance hot air generators, which blow on one spot heated air in the green house, or one uses conduits, mostly extending throughout the length of the green house, through which the heating medium flows. Such heating systems have the drawback that hot air is taken in, generated respectively in the green house in a relatively limited volume in a relatively limited area and that because of this relatively considerable variations of temperature can be present in a green house.

In green houses and buildings in relatively warm areas, for instance in Saudi Arabia, Iran, Indonesia, etc., it will often be necessary to cool the internal space of the building or the green house to prevent the interior temperature from increasing too much because of heat accumulation. The cooling systems used to date all have the drawback that in a relatively small volume and in a relatively small area cool air is generated or blown in, so that also here considerable temperature gradients in the building or green house can occur. Other known cooling systems have the further drawback that for cooling large quantities of water have to be evaporized, at which the evaporized water is blown off in the atmosphere, which is a considerable drawback in particular in areas in which water is relatively rare. Furthermore such cooling systems function insufficiently at a higher humidity of the air, by which the field of application of this cooling by evaporation is limited.

In both cases the further problem is known that the relative humidity of the air in the building has preferably to be controlled within predetermined limits. For this purpose separate devices have to be used, which encompasses additional costs for mounting and service as well as further energy costs.

SUMMARY OF THE INVENTION

The present invention is directed at providing a system for the climate control of a room in a building with which at least a number of the above drawbacks are eliminated. This objective is met by a system described above, which is characterized according to the invention in that in the room vertical separation elements are used, being not or hardly air permeable, such that the room is not divided in separate confined partial rooms and that in each case by air can be displaced by one or more of the number of fans along one of the number of horizontal air circulation paths, determined by the positioning of the separating elements and the fans, in which air circulation paths in each case at least one heating-/cooling element is provided, the air circulation paths being partially parallel to each other and in the parts air flows in the same direction.

By using a number of separated, although not completely separated, air circulation paths, the length of each of the air circulation paths can be limited such that the temperature gradient along each of the air circulation paths, whch is unavoidable, remains within predetermined limits, by which it is practically possible to maintain a desired temperature within the whole room. Furthermore, relatively small heat losses occur because of the closed character of the circulation path within the room.

It is typical for the invention that internal air circulation is provided, at which the air is passed through heating/cooling units by fans or other means for displacing air such that:

a. the free length of the paths between passages of the air does not exceed an acceptable extent (this because of the varying of the air temperature. During the movement of the air the air picks up heat in the room in which it circulates, either by radiation of the sun or by heat produced in the room itself by the metabolism of the contents of the room. The same consideration are valid for cooling air) whilst b. the associated room in which this circulation pattern is maintained can have unlimited dimensions. Under associated room is comprised an allsided confined space at which it is possible to reach through the floor each place in the room without having to pass a door or being obligated to go through a separation in another way.

Preferably the separation elements are placed about parallel relative to each other and the separation elements delimit in the space space segments connected with each other, at which around each of the separation elements an air circulation path extends such that in the room segments, being in between the separation elements, the air circulation movements are about parallel. On the one hand the uniform grouping of the total space is realized with this, and on the other hand it is possible to simply adapt the grouping with this to a substantially known modular construction of a green house or stable.

This association of constrained paths for the airflow and the unlimited reachability can be realized in a number of ways.

1. The provision of vertical separation elements, which have at most only one vertical boundery in common with an other room defining element or wall. An element is understood as a mainly not air permeable surface (straight or curved) being vertical placed, at which the top or bottom of the element connects to or is positioned near the ceiling or floor, respectively, of the space.

2. The provision of vertical fluid curtains (formed by gas or liquid) realized with local flows in vertical sense of for instance gasses, vapours, liquids (water), air or mixtures of it. These fluid curtains are embodied as a fluid flow within a flat space of which the vertical dimensions as well as one horizontal dimension (for instance length) are both separately significantly larger than the remaining horizontal dimension (for instance width). Just as with physical separation elements the vertical dimension may be taken from approximately the floor to approximately the ceiling. The flow rate in the curtains is such that the pressure gradient, to be build up by the main circulating flow, is not able to push the curtain aside such that the controlling by the gas curtain is minimized (practically a value of about 2 Pa transverse to the curtain).

3. Combination of physical separation elements and fluid curtains both in horizontal sense (separation elements and fluid curtains placed alternating behind each other) and in vertical sense (flow restriction is formed by the assembly of a separation element and a fluid curtain. The separation element can have in this instance principally a limited permeability. Furthermore the separation element can be positioned above as well as under the fluid curtain).

In one embodiment the separation elements extend to one of the walls of the space and in the wall openings are provided which are connected two to two by channels, such that each of the air circulation paths extends through one of the channels from one side of the separation element to its other side. In this case it is possible to choose for a situation in which all separation elements extend up to the same wall. However, it is also possible for the separation elements to alternating extend to opposite walls.

Although the fans and the heating/cooling elements can be positioned in several positions in each of the air circulation paths, the fact has to be considered that the fans and heating/cooling elements can form an obstacle within all of the room. Because of this it is preferred that the fans as well as the heating/cooling elements are placed in the openings in the walls and/or in the channels between the openings.

With the system according to the invention such a climate controlling can be realized that throughout a room the temperature, apart from a small temperature gradient maintained with predetermined limits, has a nearly constant value. However, it is also possible to regulate the air temperature of the air circulation paths separately and such that the difference between the temperature of adjacent air circulation paths does not exceed a predetermined value. Now a situation can be realized at which areas of somewhat differing temperature are within the space, at which the temperature within each of the areas, again apart from the small temperature gradient, is nearly constant. An area with relative high temperature can, for instance, be used for germinating of seed, whilst areas with a somewhat lower temperature are preferred for breeding of, for instance young plants.

By the temperature differentation it is also possible to very accurately determine the time of harvesting, by which for instance a synchronisation can be realized between the picking capacity or harvesting capacity or the absorption capacity of the market.

According to a preferred embodiment of the invention the separation elements extend vertically between the floor and the ceiling of the space. Vertical positioning of the elements makes it possible to not only use fixed panels or walls, but for instance also to use curtains, hanging foils and other elements being often relatively cheap and simple to mount. Preferably light transparent materials are used, such that the incidence of light in the building is not or only in a less degree limited by the separation elements. Hanging foils and curtains do have the further advantage that they can be easily slid away or can be removed, for instance, if the work in the room does necessitate this or makes it desirable.

To promote the uniformity of the air circulation, it is preferred to divide the space such that the air circulation paths do have on every place nearly about the same cross sectional area. Significant differences in the flow rate of air circulated through the space is obviated.

The fluid curtains can be used for several further functions such as:

a. Supply of gasses, which promote the growth and production of the contents of the green house or stable (for instance $CO_2$).

b. Ventilation. By means of the curtain ventilation air can be introduced.

c. Humidity control. The addition of water vapour to the air flowing through an air circulation curtain effects to total humidity of the air in the space.

d. The adding of nutritious substances, for instance in the form of aerosols.

e. The adding of pesticides against parasites.

f. The adding of a spray mist (can be combined with (c)).

g. The fluid of the fluid curtain can be used for additional cooling or heating. In this case partial green house heating by the fluid of the curtain is for instance possible with low temperature water.

The invention will now be described with reference to examplified embodiments, shown in the figures.

DETAILED DESCRIPTION OF THE PREFERRED EMBODIMENT

Figure 1:
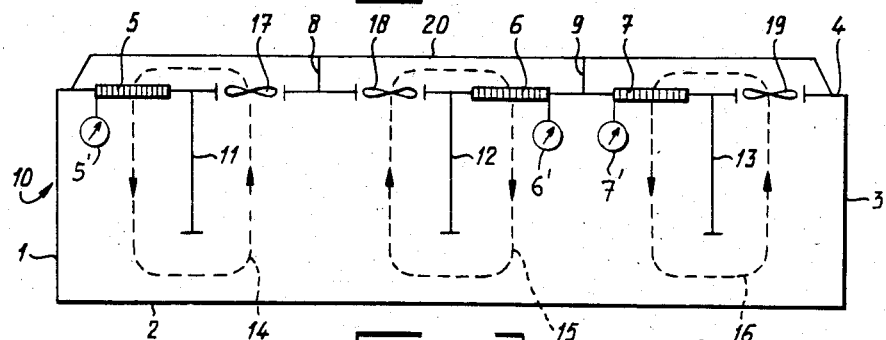
FIG. 1 schematically depicts the location of separation elements, air conditioning units and fans in a room of a building according to one embodiment of the present invention, FIG. 2 schematically depicts the location of separation elements, air conditioning units and fans in a room of a building according to a second embodiment of the present invention, FIG. 3 schematically depicts the location of separation elements, air conditioning units and fans in a room of a building according to a third embodiment of the present invention, and FIG. 4 schematically depicts the location of separation elements, air conditioning units and fans in a room of a building according to a fourth embodiment of the present invention.
Figure 2:
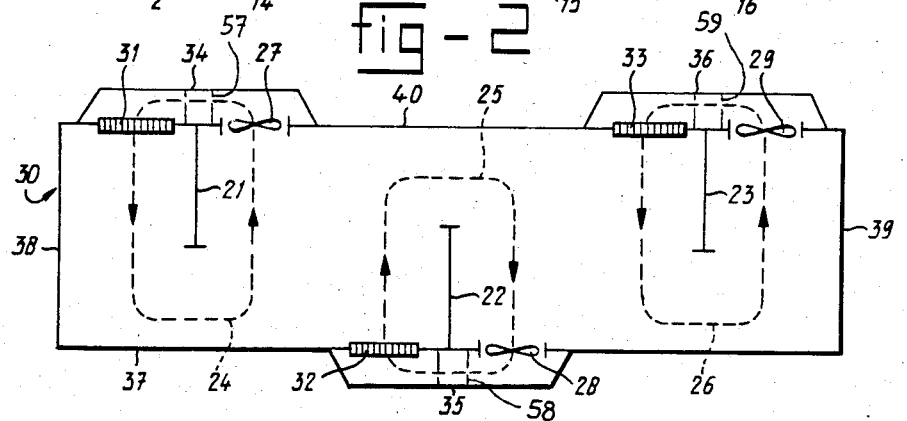
Figure 3:
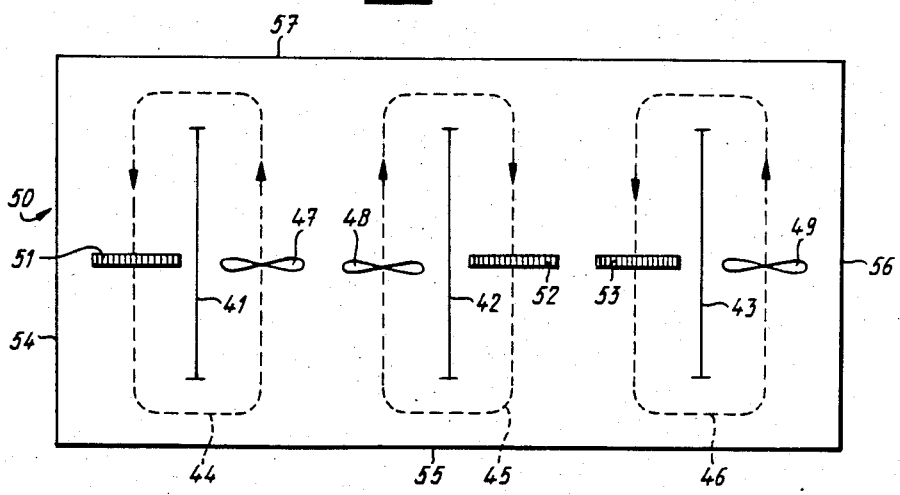

In FIGS. 1, 2 and 3 with reference to some examples schematically is shown how the space can be divided by separation elements such that a number of individual, although not completely separated, air circulation paths can be realized.

FIG. 1 shows that within room 10, which is mainly delimited by four walls 1, 2, 3 and 4, three separation elements 11, 12, 13 are positioned, which permit the creation of three air circulation paths 14, 15 and 16. The separation walls can comprise rigid walls but also curtains or similar elements, which are simple to arrange and to remove. Fans 17, 18 and 19 as well as the heating/cooling elements 5, 6 and 7 are positioned in wall 4 of room 10. Each of the air circulation paths extends partly through a channel being outside room 10 and being delimited by wall 20 and the baffles 8 and 9 disposed therein. Control means 5', 6' and 7' are connected to the respective heating/cooling elements 5, 6 and 7 to adjust their operation.

As is clear from the figure the air circulation paths 14, 15 and 16 in each case extend partly parallel to each other between the separation walls 11 and 12, 12 and 13 respectively.

FIG. 2 shows another configuration, in which the separation elements 21, 22 and 23 are alternating connected to an opposite wall. The separating elements 21 and 23 extend to wall 40 and separating element 22 extends to wall 37. Also in this embodiment the fans 27, 28 and 29, as well as the heating/cooling elements 31, 32, 33 are placed in walls 40 and 37 of space 30 in the way shown in FIG. 2. The air circulation paths in this embodiment also extend through channels, which are realized externally of the room, for instance with wall elements 34, 35, 36 or with separate pipe connections or channels positioned within a double wall in a way schematically shown in FIG. 1. The air circulation paths 24, 25, 26 also extend in this configuration in each case partly parallel between the separating elements 21 and 22, 22 and 23, respectively. Supply means 57, 58 and 59 are located in the respective wall elements 34, 35 and 46 to enable predetermined substances such as pesticides to be added to the air flowing therein.

FIG. 3 shows a third embodiment of the lay out according to the invention. In this embodiment the separation elements 41, 42 and 43 are mutually positioned in a generally parallel relationship within room 50, without completely extending up to one of the walls. The air circulation paths 44, 45 and 46 now extend the way around each of the separation walls through the respective heating/cooling elements 51, 52 and 53. The air circulation along each of the paths is in this embodiment maintained by fans 47, 48 and 49. Also here the air flows extend between the separation elements 41 and 42, 42 and 43, respectively, parallel and in the same direction.

It is noted that the invention can be practiced in rooms with any desirable size. FIG. 4 is an example of the room divided according to the invention, being two times as large as the room illustrated in FIG. 1. It will be clear for the person skilled in the art that also other rooms, being much larger, can be divided in a way according to the invention, such that in each case separate partial air flows are created, at which the air resistance in each partial flow is sufficient small to assure that only a very small temperature gradient being present across the separate partial flows.

To get an idea about the possible dimensions of the rooms in which the invention can be practiced, the room in FIG. 1 can for instance have a length and a width of 200×50 meters. The room of FIG. 4 can have dimensions of 200×100 meters.

It will be clear that instead of the fan and a heating-/cooling element for each ventilation path, also more fans and/or further heating/cooling elements for each ventilation path can be used.

To maintain the uniformity within each air circulation path as much as possible, the cross sectional area throughout the air circulation paths is preferably chosen to be constant. This means for instance for FIG. 1, that the distance between the separation elements 11 and 12 is equal to the distance between the separation elements 12 and 13. Further the distance between the separation elements 11 and 12 is about twice the distance between wall 1 and the separation element 11, wall 3 and separation element 13, respectively. The last distance between wall 1 and separation element 11 is again about the same as the distance being maintained between the extremities of the separation elements 11, 12 and 13 and wall 2 of room 10. Similar requirements concerning the dimensions can be appropriate for FIGS. 2 and 3.

As already noted, in each of the air circulation paths an about constant temperature can be realized, apart from the inevitable temperature gradient which can be limited within restricted limits, as measured across throughout the circulation path. Now it is on one hand possible to maintain in all the room a nearly constant temperature. However, on the other hand for instance it is also possible to adjust air circulation path 14 in FIG. 1 to for instance 22° C., air circulation path 15 to for instance 20° C. and air circulation path 16 to for instance 18° C. By this in the room partial areas can be provided in which the temperature remains nearly constant and each of said partial areas can be used for a predetermined purpose. Areas with a relatively high temperature are generally more favourable for germinating seeds, while areas with a somewhat lower temperature often can be favourable for breeding young plants. Also in stables, chicken runs and so on temperature differences can sometimes be desirable.

It will be clear from the above description that one of the basic features of the invention is that, notwithstanding the installation of separation elements, the complete room or space is not physically subdivided into a number of smaller rooms or spaces which are completely surrounded by physical walls. The separation elements are positioned such that each area within the room remains accessable without the necessity to open doors or to remove other obstacles. If fluid curtains are used as separation elements, then it is within the scope of the invention to extend these curtains from wall to wall, creating thereby a subdivision of the complete room or space in at least two areas in each of which a basically independent air flow can be generated. Such a fluid curtain however does not form an obstacle for any person, etc., passing from one area to another. Also, in that case the air flows in the various areas can be coupled through external channels outside the actual room or space.

I claim:

1. In a room of a building which can be employed for the cultivation of plants or to house animals, said room including walls, a floor and a ceiling and wherein an air conditioning system is provided to circulate air conditioned air therearound, the improvement wherein said air conditioning system includes at least two separation elements positioned in said room to extend in a vertical direction, each of said separation elements having opposite faces and opposite side edges, at least one of said opposite side edges being spaced from the walls of said room, each of said separation elements forming a guide for air passing thereby, and an air conditioning unit and a fan means respectively positioned adjacent the opposite faces of each of said separation elements, the air conditioning unit and fan associated with each separation element creating a horizontal flow of conditioned air around each separation element, the air conditioning unit and fan associated with each separation element being located such that adjacent air flows moving around adjacent separation elements move in parallel to one another.

2. The room with air conditioning system as defined in claim 1, wherein said separation elements are oriented in parallel with one another.

3. The room with air conditioning system as defined in claim 2, wherein said separation elements are equally spaced from one another.

4. The room with air conditioning system as defined in claim 2, wherein said room has opposite front and rear walls and opposite left and right walls, and wherein said separation elements extend toward said front and rear walls.

5. The room with air conditioning system as defined in claim 4, wherein the opposite side edges of said separation elements are equally spaced from the adjacent front and rear walls of said room.

6. The room with air conditioning system as defined in claim 4, wherein the air conditioning unit and fan associated with each separation element is located adjacent the opposite faces thereof at corresponding points between its opposite side edges.

7. The room with air conditioning system as defined in claim 4, wherein one of the opposite side edges of each separation element is connected to one of the front and rear walls of said room.

8. The room with air conditioning system as defined in claim 7, wherein the wall of the room to which a separation element is attached includes two openings associated with each separation element, each opening being spaced from an opposite face of the associated separation element, and wherein the air conditioning element and fan associated with each separation element is position in a respective associated opening.

9. The room with air conditioning system as defined in claim 8, wherein each separation element is connected to the rear wall of said room.

10. The room with air conditioning system as defined in claim 8, wherein alternate separation elements are connected to the rear wall and the front wall of said room.

11. The room with air conditioning system as defined in claim 8, wherein a plurality of pairs of coplanar separation elements are connected to both the front and rear walls of said room.

12. The room with air conditioning system as defined in claim 8, wherein the front and rear walls of each room include interior sides facing the separation elements in the room and exterior sides, and wherein each of said front and rear walls to which a separation element is attached includes a duct means connected to the exterior side thereof which forms an air circulation channel between the two openings in the wall which are associated with each separation element connected to the interior side thereof.

13. The room with air conditioning system as defined in claim 1, wherein each separation element is made of a flexible, light, transparent material.

14. The room with air conditioning system as defined in claim 1, wherein each separation element is a solid curtain.

15. The room with air conditioning system as defined in claim 1, wherein each separation element is a fluid curtain.

16. The room with air conditioning system as defined in claim 1, wherein each separation element extends all the way between the floor and ceiling of said room.

17. The room with air conditioning system as defined in claim 1, wherein each air conditioning unit comprises a heating means.

18. The room with air conditioning system as defined in claim 1, wherein each air conditioning unit comprises a cooling means.

19. The room with air conditioning system as defined in claim 17, wherein each air conditioning unit comprises adjustment means to adjust the operating temperature of the heating means independently from the other air conditioning units.

20. The room with air conditioning system as defined in claim 18, wherein each air conditioning unit comprises adjustment means to adjust the operating temperature of the cooling means independently from the other air conditioning units.

21. The room with air conditioning system as defined in claim 1, wherein at least one of the air conditioning units comprises means to control the humidity in the air flow created by the associated fan.

22. The room with air conditioning system as defined in claim 15, wherein at least one of the air conditioning units comprises means to introduce predetermined substances in suitable form into at least one of the air flows around at least one of the separation elements.

23. The room with air conditioning system as defined in claim 22, wherein said predetermined substances are nutritious substances introduced in the form of aerosols.

24. The room with air conditioning system as defined in claim 22, wherein said predetermined substances are pesticides against parasites.

* * * * *